United States Patent [19]

Fulmer

[11] 4,182,220
[45] Jan. 8, 1980

[54] PUSH ROD ASSEMBLY

[75] Inventor: Keith H. Fulmer, Mishawaka, Ind.

[73] Assignee: The Bendix Corporation, Southfield, Mich.

[21] Appl. No.: 864,166

[22] Filed: Dec. 27, 1977

[51] Int. Cl.$^2$ .................. F01B 15/02; F15B 15/18
[52] U.S. Cl. ........................................ 91/217; 60/551;
  60/579; 60/592; 60/593; 60/594; 91/391 R
[58] Field of Search ............. 91/217, 391 R, 391 A,
  91/437, 432, 422; 60/547, 550, 551, 565, 566,
  568, 569, 592, 593, 579, 594; 74/518

[56] References Cited

U.S. PATENT DOCUMENTS

| | | | |
|---|---|---|---|
| 2,705,940 | 4/1955 | Edwards | 91/391 R |
| 2,706,020 | 4/1955 | Freers | 91/391 A |
| 2,844,228 | 7/1958 | Schnell | 91/391 A |
| 3,354,641 | 11/1967 | Helvern | 91/391 A |
| 3,910,048 | 10/1975 | Gardner | 60/568 |

FOREIGN PATENT DOCUMENTS

| | | | |
|---|---|---|---|
| 2411701 | 9/1975 | Fed. Rep. of Germany | 60/551 |

*Primary Examiner*—Abraham Hershkovitz
*Attorney, Agent, or Firm*—Leo H. McCormick, Jr.; Ken C. Decker

[57] ABSTRACT

A push rod assembly having a first section and a second section through which an input force is transmitted to an output member. The first section includes a cylindrical member with a bellows attached thereto. The cylindrical member has a bore therein. The second section includes a piston that is attached to a brake pedal by a pivot pin. The piston divides the bore in the cylindrical member into a first chamber and a second chamber. The piston has a passage therethrough that connects the first chamber with the second chamber. A valve located in the passage controls the communication of fluid from the first chamber to the second chamber. A linkage member which extends into the bore in the cylindrical member is connected to a plate with a slot therein. The pivot pin associated with the brake pedal extends through the slot to attach the plate to the brake pedal. In the rest position, the plate engages a stop and allows the pivot pin to move in the slot and bring the linkage member into engagement with the valve to allow free communication through the passage in the piston. A switch member, responsive to movement of the brake pedal by an input force, allows a source of vacuum to evacuate air from the bellows to create a pressure differential therein with air in the surrounding environment. The pressure differential causes the bellows to contract and thereby move the cylindrical member at a faster rate than the piston and move the valve away from the linkage to interrupt the fluid communication through the passage. With fluid communication through the passage interrupted, a fluid lock is created in the first chamber. Thereafter, the input force from the brake pedal is transmitted to the cylindrical member from the piston through the fluid in the first chamber.

9 Claims, 2 Drawing Figures

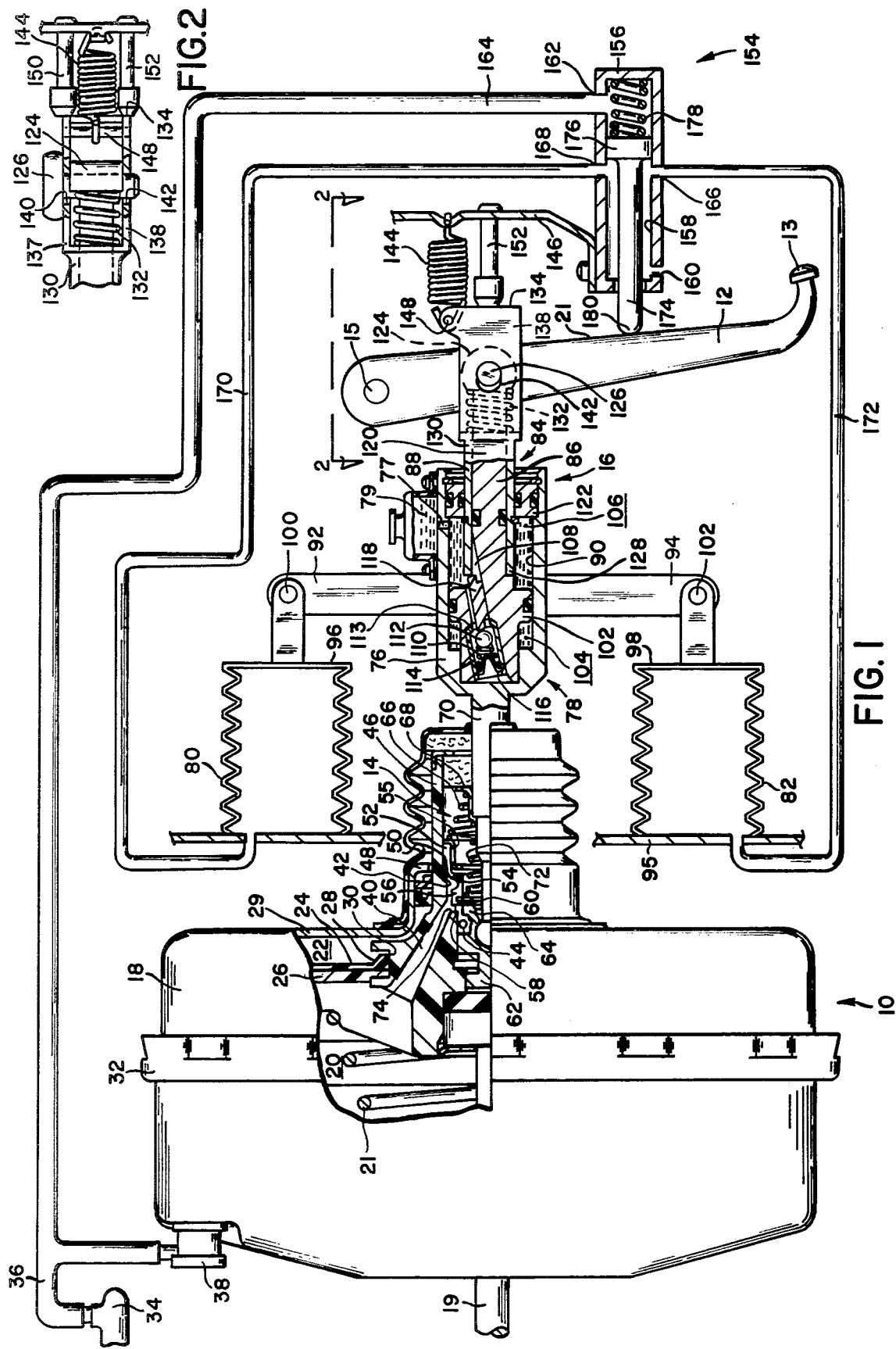

PUSH ROD ASSEMBLY

BACKGROUND OF THE INVENTION

This invention relates to a push rod assembly for transmitting an input force from an operator to a pneumatically operated power brake servomotor.

In most brake systems having a pneumatically operated power brake servomotor, a certain amount of lost motion occurs in moving the control valve from a rest position into an operational or lap position. The brake pedal movement required to move the control valve to the top position can account for as much as one tenth of the total arcuate movement of the brake pedal. If the height of the brake pedal with respect to the floor of a vehicle is increased to compensate for this "lap" movement, an operator is required to raise his foot to a different height than the accelerator to move the brake pedal rather than merely rotating on the heel of his shoe to engage his foot with the brake pedal as provided by the current design of most vehicles.

Several attempts have been made to develop brake pedal linkages which change the ratio of movement of an output push rod as compared to the brake pedal such as: the toggle linkage disclosed in U.S. Pat. No. 3,263,428; the slotted lever disclosed in U.S. Pat. No. 3,063,427; the resiliently positioned levers in U.S. Pat. No. 3,633,366; and the lever and cam arrangement disclosed in U.S. Pat. No. 3,646,831. The disadvantage in many of these prior art brake pedals is the numerous parts required to co-function in order to produce a variance in the movement of the output push rod as compared to the input movement of a brake pedal.

SUMMARY OF THE INVENTION

I have devised a push rod assembly having a first section and a second section through which an input force is transmitted to an output push rod. The first section includes a housing that is connected to the output push rod and a beam or lever arm that connects the housing to a bellows.

The second section includes a piston which has a first diameter section that separates a bore in the housing into a first chamber and a second chamber and a second diameter that extends through the housing and is secured to the brake pedal by a pivot pin. The piston has a passage therein for connecting the first and second chamber to each other. A valve located in the passage controls the communication of fluid through the passage. A sleeve which surrounds the second diameter of the piston has an end plate with a slotted section thereon. A connecting pin on the brake pedal extends through the slotted section to connect the sleeve to the brake pedal. A switch associated with the brake pedal sequentially connects a source of vacuum and air at atmospheric pressure with the bellows.

In the rest position the brake pedal engages the switch to allow air to freely enter the bellows. In addition, as the brake pedal approaches the rest position, the end plate engages a stop allowing the connecting pin to slide in the slotted section and bring the sleeve into engagement with the valve to allow free communication of fluid between the first and second chambers.

In response to an operator input force, the brake pedal moves from its rest position. Initial movement activates the switch to allow vacuum to evacuate air from the bellows. As the air is removed from the bellows, a pressure differential is created thereacross with the air in the surrounding environment. This pressure differential creates a force which is transferred to the first housing through the beam or lever arms. This force moves the first housing at a faster rate than the piston is moved by the brake pedal, allowing the valve to close and interrupt communication of fluid through the passage to create a fluid lock in the first chamber. Thereafter, the input force from the operator is transmitted from the piston to the output push rod through the fluid locked in the first chamber.

It is the object of this invention to provide a push rod assembly with a first section that initially moves independently of a second section, moved by an input force applied to the second section until a predetermined movement has occurred and thereafter with the second section to provide an output member with a varying rate of movement.

It is another object of this invention to provide a push rod assembly having a first section and a second section with an actuator control for initially moving the first and second section at different rates, and when a predetermined travel has occurred, at the same rate.

It is a further object of this invention to provide a push rod assembly with an extender mechanism that initially moves an output push rod independently of an operator input force and when a predetermined movement has occurred, the operator input force is transmitted through the extender mechanism to further move the output push rod.

These and other objects should be apparent from reading the specification while viewing the drawings.

BRIEF DESCRIPTION OF THE DRAWINGS

FIG. 1 is a schematic illustration of a servomotor including a sectional view of a push rod mechanism made according to the principals of this invention; and FIG. 2 is a sectional view taken along lines 2—2 of FIG. 1.

DETAILED DESCRIPTION OF THE INVENTION

In the servomotor 10 shown in FIG. 1, a brake pedal 12 is connected to a control valve 14 by a push rod linkage mechanism 16. The push rod linkage mechanism 16 is adapted to respond to an initial input force on the brake pedal 12 and bring the control valve 14 to an operational position prior to movement of the control valve 14 by the input force.

In more particular detail, the servomotor 10 includes a housing 18 which is divided into a front chamber 20 and a rear chamber 22 by a diaphragm 24 and plate 26. The diaphragm 24 has a first end secured in groove 30 on hub 28 and a second end fixed between the twist lock connection 32 of the housing 18 to seal the front chamber 20 from the rear chamber 22. The front chamber 20 is connected to the intake manifold 34 of a vehicle by conduit 36. A check valve 38 attached to the housing 18 only permits flow from the front chamber 20 toward the intake manifold through conduit 36.

The front chamber 20 is connected to the rear chamber 22 through a first passage 40, bore 42 and a second passage 44 in the hub 28. The hub 28 has an annular projection 46 that extends through opening 48 in the housing 18 for retaining control valve 14. Annular projection 46 has a shoulder 50 in bore 42 against which lip 52 of poppet 54 is positioned by retainer 55. The poppet 54 has a face member 56 with a vacuum seat 58 and an atmospheric seat 60 located thereon. A plunger 62 located in bore 42 has a face 64 located thereon which is urged toward the atmospheric seat 60 by return spring 66 acting on retainer 68 connected to push rod 70. A spring 72 located between retainer 68 and face member 56 urges the atmospheric seat 60 toward face 64 to assure a seal is created between the atmosphere and the interior of the housing 18 when the servomotor 10 is in the rest position shown in FIG. 1 and against annular face 74 when the control valve 14 is operated. The distance that the face member 56 moves from the rest position to engagement of vacuum seat 58 and face 74 is commonly referred to as "lap" and represents lost motion in the movement of push rod 70 by the movement of the brake pedal 12 that is attenuated by the push rod linkage mechanism 16.

The push rod linkage mechanism 16 includes a first section 78 made up of housing 76 and associated actuation bellows 80 and 82 and a second section 84 made up of piston 86 and sleeve 88.

The housing 76 which is fixed to push rod 70 has a plurality of arms or beams 92 and 94 radially extending therefrom which are attached to ends 96 and 98 of bellows 80 and 82, respectively, by pins 100 and 102. The housing 76 has a bore 90 located therein for receiving a large diameter section 102 of piston 86. The large diameter 102 of piston 86 divides bore 90 into a first chamber 104 and a second chamber 106. A passage 108 in piston 86 connects the first chamber 104 with the second chamber 106. A poppet valve 110 made up of ball 112, spring 114, retainer 116, and actuation pin 118 controls the communication of fluid between the first chamber 104 and the second chamber 106.

The piston 86 has a second diameter section 120 which extends from the first diameter section 102 through housing plug 122. The second diameter section 120 has an eyelet 124 on the end thereof through which pin 126 secures the piston 86 to the brake pedal 12.

Sleeve 88 which surrounds the second diameter section 120 of piston 86 has a first end 128 adapted to engage actuation pin 118 and a second end 130. A spring 132 which surrounds the second diameter section 120 of the piston 86 engages eyelet 124 and urges the sleeve 88 toward the first diameter 102 of piston 86.

An end plate 134 has a first arm 137 and a second arm 138 attached to the second end 130 of the sleeve 88. Arms 139 and 138 have slots 140 and 142 located therein, as best shown in FIG. 2, through which pin 126 connects sleeve 88 to brake pedal 12. A spring 144 attached to stationary bracket 146 and connected to end plate 134 by pin 148 holds end plate 134 against a stop bolts 150 and 152 on bracket 146 to allow pin 126 to move in slots 140 and 142. Movement of end plate 134 causes end 128 of sleeve 88 to correspondingly move actuation pin 118 in passage 108 and push ball 112 away from seat 113 to permit free communication of fluid between chambers 104 and 106.

A switch 154 attached to bracket 146 has a housing 156 with a bore 158 located therein. A first port 160 in housing 156 connects bore 158 to the atmosphere, a second port 162 in housing 156 connects bore 158 to the intake manifold 34 by way of conduit 164, and a third series of ports 166 and 168 in housing 158 connects bore 156 to bellows 80 and 82 by way of conduits 170 and 172. A plunger or spool 174 located in bore 158 has a first land 176 that separates the first port 160 from the second port 162. A spring 178 located in bore 158 urges land 176 toward port 160, however, the return spring associated with brake pedal 12 is of such strength that spring 178 is compressed when end 180 of the spool engages brake pedal 12 in the rest position shown in FIG. 1.

MODE OF OPERATION OF THE INVENTION

When an internal combustion engine is operating, vacuum is created at the intake manifold 34. This vacuum is communicated to housing 18 and evacuates air from the front and rear chambers 20 and 22 to vacuum suspend the diaphragm 24 and plate 26 and allow return spring 21 to position hub 28 against the rear shell 29.

At the same time, brake pedal 12 engages end 180 of spool 174 to position land 176 between the second port 162 and third ports 166 and 168 and allow air to be communicated through conduits 170 and 172 to bellows 80 and 82, respectively. With air in the bellows 80 and 82, the resiliency thereof moves the beam or arms 92 and 94 away from the fixed housing 95. Similarly, end plate 134 engages stops 150 and 152 to move sleeve 88 with respect to piston 86 and bring actuation pin 118 into engagement with ball 112 to allow free communication of fluid between chambers 104 and 106 through passage 108.

When an operator desires to effect a brake application, an input force is applied to pad 13 of brake pedal 12. The input force causes the brake pedal 12 to rotate about pivot pin 15 and impart linear movement to piston 86.

Upon initial movement of brake pedal 12, land 176 of spool 174 in switch 154 moves past ports 166 and 168 to allow vacuum present in conduit 164 to evacuate air from bellows 80 and 82 through conduits 170 and 172. As air is removed from bellows 80 and 82, a pressure differential occurs with the air in the surrounding environment. This pressure differential causes the bellows to collapse and move toward the fixed housing 95. As the bellows move, housing 76 is moved to supply push rod 70 with an input force sufficient to overcome return spring 66 and move vacuum seat 50 of the control valve 14 into engagement with annular face 74 to interrupt communication of vacuum between the front chamber 20 and the rear chamber through passage 40.

At the same time, pivot pin 126 moves in slots 140 and 142, since spring 144 holds the end plate 134 against stops 150 and 152, to move piston 86 with respect to end 128 of sleeve 88. As the piston 86 moves away from end 128 of the sleeve 88, spring 114 moves ball 112 onto seat 113 to interrupt fluid communication through passage 108. Since housing 76 is initially independently moved by the bellows 80 and 82 the size of chamber 104 is changed to reflect such independent movement. When ball 112 is seated, a hydraulic fluid lock is created in chamber 104.

The seating of vacuum seat 58 on the annular face 74 is designed to coincide with pin 126 reaching the bottom of slots 140 and 142. Thereafter, the input force applied to pad 13 is transmitted to housing 76 from piston 86 through the fluid locked in chamber 104 to move plunger 62 away from face 54 of poppet 54 in the control valve 14 and allow air to enter the rear chamber 22 through passage 44. With air in the rear chamber 22 an operational pressure differential occurs across the diaphragm 22 and plate 26. This operational pressure differential develops a force that is carried into hub 28 to provide push rod 19 with an output force.

Upon termination of the input force to pedal 12, the linkage mechanism 16 moves as a unit until such time as end plate 134 engages stop pins 150 and 152 causing pivot pin 126 to slide in slots 140 and 142 and bring end 128 on sleeve into engagement with actuation pin 118. Movement of actuation pin 118 pushes ball 112 away from seat 113 and allows free fluid communication between chambers 104 and 106.

Should the fluid in chamber 104 and 106 change in volume for any reason, such as temperature expansion, compensation port 77 allows the fluid to expand and contract in reservoir 79 to assure that the operational volume remains constant.

As the brake pedal 12 approaches its rest position shown in FIG. 1, lever surface 21 contacts end 180 and moves stem to interrupt vacuum communication through ports 166 and 168 and thereafter allow air to enter conduit 170 and 172 for distribution to bellows 80 and 82. With air in the bellows 80 and 82, the housing 76 is moved to its rest position as fluid passes from chamber 104 into chamber 106.

I claim:

1. A push rod assembly comprising:
   a first housing having a bore therein;
   piston means cooperating with said first housing to define a first chamber and a second chamber in said bore, said piston means having a passage for connecting said first chamber with said second chamber;
   valve means located in said passage;
   linkage means connected to said valve means for operating said valve means to allow free communication of fluid between said first and second chambers;
   actuator means responsive to an input force applied to said piston means for moving said first housing at a different rate than the input force moves said piston means causing said first chamber to expand and said second chamber to contract in size;
   a retainer for inhibiting the movement of said linkage means by the input force to allow said valve means to terminate fluid communication through said passage and establish a fluid lock in said first chamber, said input force thereafter being applied to said housing from the piston means through the fluid in said first chamber;
   bellow means connected to said first housing; and
   switch means responsive to movement of said piston means by the input force for allowing a source of vacuum to evacuate air from said bellow means to create a pressure differential thereacross with air in the surrounding environment, said pressure differential acting on said bellow means to move said first housing and aid in the establishment of said fluid lock.

2. The push rod assembly, as recited in claim 1, wherein said valve means includes:
   a poppet located in said passage;
   a first spring for urging said poppet toward a seat in said piston means; and
   an actuation pin located in said passage, said actuation pin engaging said linkage means and moving said poppet away from said seat in opposition to said spring to allow said free communication of fluid from the first chamber to said second chamber.

3. The push rod assembly, as recited in claim 2, wherein said piston means includes:
   a cylindrical member having a first diameter section located in said bore and a second diameter section which projects from said housing, said second diameter section having an eyelet on the end thereof; and
   a pivot pin extending through said eyelet for connecting said piston means with an input member.

4. The push rod assembly, as recited in claim 3, wherein said linkage means includes:
   a sleeve slidable on and concentric to said second diameter section of the cylindrical member of the piston means, said sleeve having a first end and a second end;
   a plate extending from said second end, said plate having a slot therein, said pivot pin extending through said slot; and
   a second spring surrounding said second diameter section of the cylindrical member of the piston means and engaging said second end of the sleeve for urging said first end toward said actuation pin.

5. The push rod assembly, as recited in claim 4, further including:
   a stop member adapted to engage said plate and allow said pin to slide in said slot to assure said first end of said sleeve moves said actuation pin into engagement with said poppet to allow free communication between said first and second chambers upon termination of said input force.

6. The push rod assembly, as recited in claim 5, wherein said retainer includes:
   a third spring for holding said plate against said stop member to allow said pivot pin to slide in said slot and allow said first spring to move said poppet onto said seat and terminate the fluid communication between said first and second chambers. pg,15

7. The push rod assembly, as recited in claim 2, further including:
   a reservoir connected to said first housing for retaining a fixed quantity of fluid, said reservoir responding to movement of said piston means in said first housing bore to maintain a predetermined volume of fluid in the first and second chambers.

8. The push rod assembly, as recited in claim 1, wherein said switch means includes:
   a second housing having a second bore therein with a first port connected to atmosphere, a second port connected to said bellows, and a third port connected to the source of vacuum;
   a spool located in said second bore having a land thereon for preventing simultaneous connection between said second port and said first and third ports, and
   a fourth spring for moving said land on the spool to allow communication between said second and third ports and permit vacuum to evacuate air from said bellows.

9. The push rod assembly, as recited in claim 8, further including:
   a first arm attached to said first housing;
   a second arm attached to said first housing, said first and second arms being pivotally attached to said bellows, said bellows in response to said pressure differential uniformly applying a moving force to said first housing through said first and second arms.

* * * * *